Oct. 17, 1933.  J. I. TAYLOR  1,931,333
METHOD OF MAKING CHANNEL STRIPS
Original Filed May 18, 1928  2 Sheets-Sheet 1
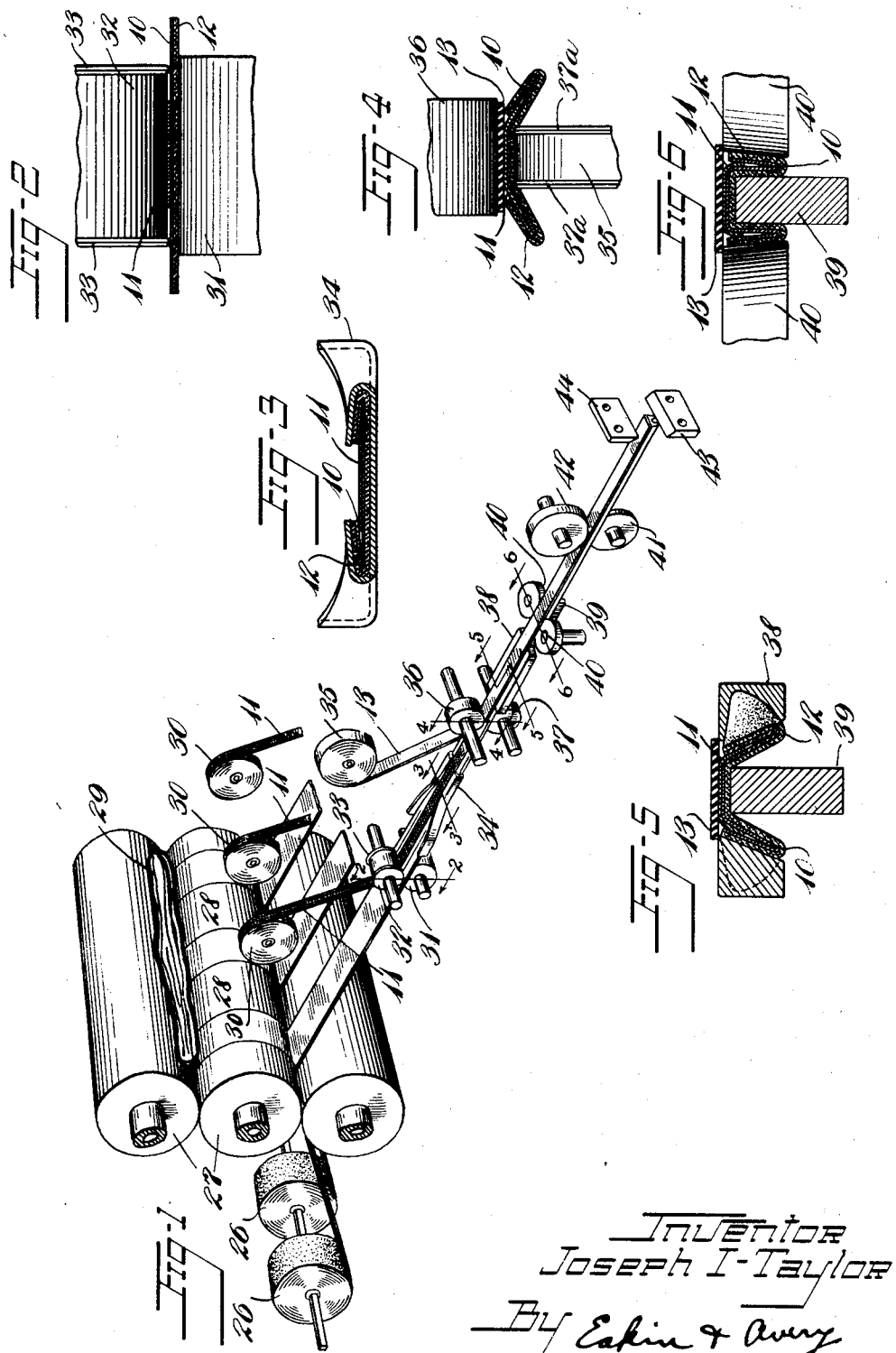
Inventor
Joseph I. Taylor
By Eakin & Avery
Attys.

Oct. 17, 1933.  J. I. TAYLOR  1,931,333
METHOD OF MAKING CHANNEL STRIPS
Original Filed May 18, 1928  2 Sheets-Sheet 2
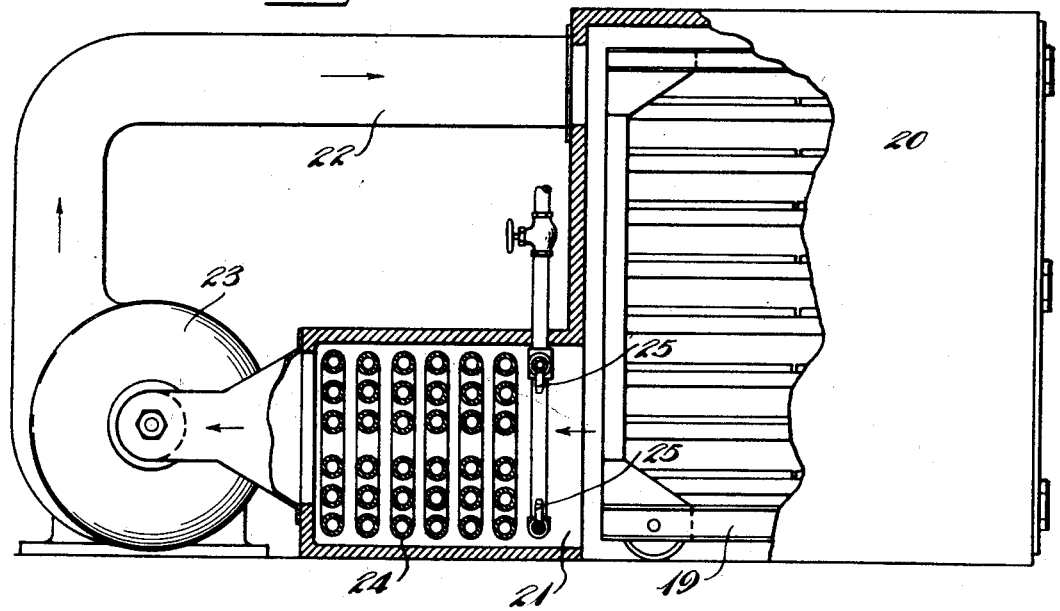
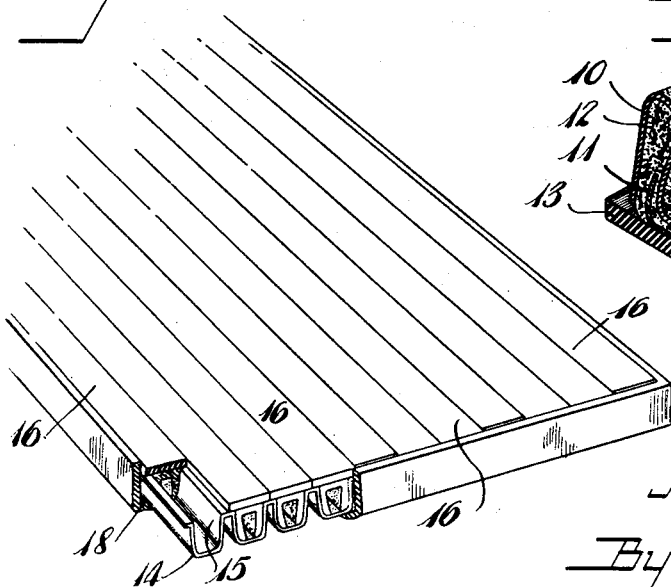
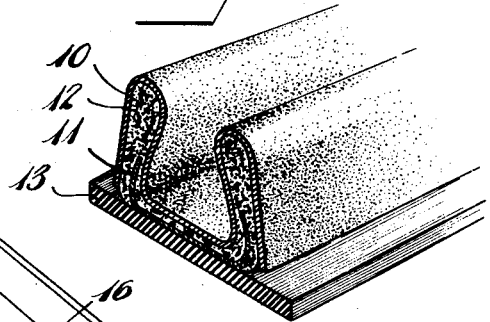
Inventor
Joseph I. Taylor
By Eakin & Avery
Attys.

Patented Oct. 17, 1933

1,931,333

UNITED STATES PATENT OFFICE 1,931,333

METHOD OF MAKING CHANNEL STRIPS

Joseph I. Taylor, Ridgewood, N. J., assignor to The B. F. Goodrich Company, New York, N. Y., a corporation of New York Original application May 18, 1928, Serial No. 278,887. Divided and this application August 14, 1930. Serial No. 475,333

5 Claims. (Cl. 18—59)

This invention is a division of my copending application Serial No. 278,887 filed May 18, 1928, and relates to channel strips such as are used as glass-run channels in the windows of automobiles to cushion and seal the margins of the window glass slidably mounted therein or other articles of rubber having a fibrous cover thereon and to methods of making such strips.

My chief objects are moderate cost, lightness, avoidance of noise, high cushioning and sealing properties and durability in such strips. More specific objects are to provide for the convenient and satisfactory employment of sponge rubber as a cushioning element in such a strip, preferably without preforming the sponge rubber as such or vulcanizing it prior to its association with other elements of the strip, which heretofore has been considered necessary so far as I am aware; to provide for progressively forming the strip as the rubber element thereof is continuously drawn from a calender in which it is prepared; to provide economy in the shaping and in the vulcanizing of the strip; and to provide an accurately shaped channel strip comprising sponge rubber without vulcanizing the strip or the sponge rubber element thereof under pressure in a mold completely confining the strip.

Of the accompanying drawings:

Fig. 1 is a diagrammatic view of a calender and associated apparatus embodying and adapted for the practice of my invention in its preferred form.

Fig. 2 is a section on line 2—2 of Fig. 1.
Fig. 3 is a section on line 3—3 of Fig. 1.
Fig. 4 is a section on line 4—4 of Fig. 1.
Fig. 5 is a section on line 5—5 of Fig. 1.
Fig. 6 is a section on line 6—6 of Fig. 1.

Fig. 7 is an elevation, with parts sectioned and broken away, of vulcanizing apparatus adapted for the practice of my invention.

Fig. 8 is a perspective view of a work-holding tray constituting a part of the apparatus of Fig. 7, with the work therein, parts being sectioned and broken away.

Fig. 9 is a perspective view of a piece of the finished product.

Referring to the drawings, the finished strip (Fig. 9) comprises a channeled or U-shaped cushion body 10 of sponge rubber, a reinforcing strip 11, preferably of square-woven fabric, extending across the base and into the legs of the U-shaped sponge-rubber body, a decorative and anti-friction covering strip 12, preferably of felt, constituting a lining for the interior of the sponge-rubber channel and extending outward onto the outer faces of the legs and terminating flush with the base of the sponge-rubber body, and a stiff foundation or backing strip 13, preferably of a fibrous rubber composition, which is wider than and is applied to the base of the channel structure just described, to give the product longitudinal stiffness and inextensibility and to provide an anchorage flange on each side of the base of the structure. All of the elements described are preferably secured together by vulcanization.

In the production of sponge rubber it has been considered necessary to confine the composition quite positively during the vulcanization, as by vulcanizing it in a closed, rigid mold in order to prevent non-uniformity in the cellular character of the product as the result of excess expansion of the generated gases in some parts of the mass or collapse of some of the cells formed by the gas, and also it is desirable to employ, in vulcanizing a sponge-rubber composition in a mold, a porous mold structure such as to permit the generated gases to escape from the cells formed in the surface region of the mass and thus to provide a continuous and smooth but thin skin of dense, non-cellular rubber at the surface of the sponge-rubber body, as distinguished from a product vulcanized in contact with an impervious mold surface and consequently having cells open to its surface.

I find that the surface skin of non-cellular rubber also is desirable in the case of the sponge-rubber body 10 vulcanized to the felt covering 12 and the base strip 13 as in Fig. 9, for good adhesion of the parts, and that the felt strip 12 and the reinforcing strip 11 provide the necessary porous confining means for producing the skin by permitting the escape of gases without accompanying escape of rubber and at the same time provide a sufficient confinement or restraint of the sponge-rubber compound to prevent unequal "blowing" or distortion of the sponge-rubber mass when the assembly shown in Fig. 9 is vulcanized in only such confining means as the open tray illustrated in Fig. 8, as distinguished from the usual closed mold confining the article by contact with its entire surface, when the parts are accurately assembled, by the procedure illustrated in Figs. 1 to 6, in the relationship in which they are there shown, the sponge-rubber composition 10 being calendered onto the cover strip 12 and the reinforcing strip 11 and the base strip 13 being added and the whole structure being brought substantially to its final form, except for the expansion or "blowing" of the sponge-rubber composition, before the vulcanizing step is begun.

The vulcanizing tray of Fig. 8 comprises a member 14 formed in its upper face with a plurality of parallel grooves such as the groove 15 each adapted to receive therein the leg portions only of a length of the built-up but unvulcanized channel strip, designated 16. The cover strip 12, in contact with the walls of the groove, and the base strip 13, bridging the groove, sufficiently confine the sponge-rubber of the strip during vulcanization, when the parts are accurately assembled in the relation shown in Figs. 6 and 9, to provide accuracy of form and uniformity of the cellular condition in the vulcanized product. The member 14 conveniently may be made of bent sheet metal and may be fitted into a metal pan 18 for strength of the assembly.

The vulcanization is conveniently effected by mounting a number of the trays with the work therein upon a vulcanizer car 19 (Fig. 7), placing the car in a vulcanizing chamber 20 provided with circulating means such as the conduits 21, 22 and blower 23 and heating means such as the steam coil 24 for a fluid vulcanizing medium. It is desirable that the medium be of a moist character in order that the rubber composition, including a "blowing" ingredient, which preferably is sodium bicarbonate 10% and ammonium carbonate 2½%, by weight in a composition containing 30% of rubber, will properly "sponge" or "blow" as an incident of the vulcanization, but I have found that when steam or air approximately saturated with steam is employed it results in a harmful loosening effect upon the fibers of the felt cover 12. In order to avoid such effect and at the same time obtain a proper sponging of the rubber composition I preferably employ air primarily as the vulcanizing medium and provide only a moderate amount of moisture in it, as by providing one or more vents, such as those afforded by the vent nipples 25, 25, from the steam coil 24 to the interior of the air-circulating system. It is also important to bring the stock to vulcanizing temperature rapidly in order to obtain a proper sponging of the rubber.

The strip elements of Fig. 9, for the best adhesion and accuracy of form, require to be assembled by progression longitudinally of the strip, and the preferred procedure and apparatus for so assembling them are shown in Figs. 1 to 6.

As there shown a plurality of strips of the covering felt 10 in flat form are drawn from respective supply rolls 26, 26 through a calender 27 and in passing through the calender receive upon their upper faces respective coatings or face layers of the sponge-rubber composition 10 in unvulcanized and non-cellular condition, the intervening strips of rubber composition 28, 28 on the middle calender roll passing back into the stock bank 29.

From stock rolls 30, 30 the reinforcing strips 11, 11, preferably rubberized with a non-blowing composition, are drawn into progressive contact with the middle zone of the rubber-coated upper faces of the respective cover strips 10 and are progressively pressed thereagainst by a pair of pinch rolls 31, 32 between which the composite strip is drawn.

The upper pinch roll, 32, is shorter than the lower roll 31 and is formed at its ends with respective scoring flanges 33, 33 adapted to score the layer of rubber composition 10, as shown clearly in Fig. 2, to facilitate the folding of the coated strip along determinate longitudinal lines of fold such that each side margin of the coated strip will be overlapped upon the adjacent side margin of the reinforcing strip 11, as is clearly shown in Fig. 3.

For so folding the composite strip the strip is drawn from the pinch rolls 31, 32 through a folding sleeve 34 of suitable form.

As the folded composite strip passes from the folding sleeve 34 the base strip 13, drawn from a supply roll 35, is progressively pressed onto the base side of the strip assembly by the passage of the base strip and the assembly between a pair of pinch rolls 36, 37. The lower pinch roll 37 is shorter than the upper roll 36 and is formed at its ends with respective scoring flanges 37ª, 37ª adapted to press grooves in the under face of the composite strip, as shown clearly in Fig. 4, and, in coaction with the contact of the base strip 13 with the inwardly folded margins of the cover strip 12, to initiate a downward folding of the side margins or leg portions of the structure, such downward folding of the leg portions then being completed by a folder 38 of suitable form comprising an anvil portion 39 fitting within the channel of the strip and extending beyond the rest of the folder to serve as a backing for the legs of the strip against the force of a pair of rollers 40, 40 mounted on vertical axes and adapted to compact the respective legs of the channel strip against the anvil member as the strip is drawn forward between them.

As the strip passes farther forward, the base of the structure, now including the base strip 13, is further compacted by being passed between a pair of pinch rollers 41, 42, the lower roller 41 running in the channel of the strip.

As the compacted strip passes from these rolls it is cut into suitable length for mounting in trays such as that shown in Fig. 8, as by means of a pair of suitably mounted and timed shear-blades 43, 44. The trays preferably are of such length as to be adapted for strips cut to the final length for use. Such lengths are then mounted in the trays and vulcanized as above described, which results in a product such as is shown in Fig. 9, the rubber composition 10 swelling and becoming cellular during vulcanization, with good adhesion to the associated elements of the strip and with a substantially uniform and desirable cross-sectional form therein. The cover strip initially may be rubberized with a non-blowing rubber composition or only with the sponge-rubber composition 10. As its edge faces are not strongly adhesive to the base strip 13 the margins of the cover strip move outward with the swelling sponge-rubber composition to the extent permitted by the walls of the groove of the tray in which the strip is mounted, giving the desired base structure for the legs of the channel strip as shown in Fig. 9.

The reinforcing strip 11 stabilizes the legs of the channel in their converging relation to each other by providing a comparatively stiff base portion in each leg and by firmly anchoring each leg at the middle of its base portion to the base strip 13, and at the same time permits the outer margin of the legs to serve effectively as soft and flexible cushioning members. The reinforcing strip 11 also adheres strongly to both the sponge rubber body and the base strip 13 and thus provides a well bonded structure.

Various modifications are possible within the scope of my invention as defined in the appended claims.

I claim:

1. The method of making a channel strip of rubber with a fibrous covering sheet thereon which comprises coating the fibrous sheet with an unvulcanized sponge-rubber composition, progressively applying a fabric reinforcing strip to the middle zone of the coated side of a covering strip of the coated sheet, progressively folding over the side margins of the covering strip into overlapped relation to the reinforcing strip and thereby bringing coated surfaces of the covering strip together, progressively bending the resulting composite strip to channel form with the covering strip extending throughout the interior surface of the channel thereof, applying a relatively stiff strip of material to the exterior of the base of the channel structure, and subjecting the completed strip to vulcanizing heat without such confinement as to cause the confining means to limit the volume increase of the sponge rubber composition.

2. The method of making an article comprising sponge rubber and a fibrous cover thereon which comprises associating the fibrous covering material with a mass of unvulcanized sponge-rubber composition and subjecting the resulting structure to vulcanizing heat in moist air without such confinement as to cause the confining means to limit the volume increase of the structure.

3. The method of making a channel strip comprising sponge rubber which comprises forming a channel-shaped strip of unvulcanized sponge-rubber composition in association with a reinforcing strip of fabric extending across the middle zone of the base of the channel and having its side margins extending into the respective legs of the channel, applying a stiffening strip to the base of the structure, and subjecting the assembly to vulcanizing heat.

4. The method of making a channel strip comprising rubber which comprises forming a channel-shaped strip of unvulcanized rubber composition in association with a reinforcing strip of fabric extending across the middle zone of the base of the channel and having its side margins extending into the respective legs of the channel, applying a stiffening strip to the base of the structure, and subjecting the assembly to vulcanizing heat.

5. The method of making window guide channels composed of a body of sponge-rubber and a flexible covering material thereon, comprising, forming a blank by associating a strip of covering material with a strip of unvulcanized sponge-rubber composition, so that the edges of the covering material are spaced apart to expose a central portion of the sponge-rubber composition, applying a backing strip to said exposed central portion of the unvulcanized sponge-rubber composition, positioning the resulting blank in a mold so that the blank is of substantially channel shape in cross-section with the backing member forming the base of the channel and the portion having the covering material thereon forming the legs of the channel and then subjecting the blank to vulcanization to cause the sponge-rubber composition to expand and form the article to the final desired channel-shape.

JOSEPH I. TAYLOR.